Oct. 10, 1961 G. S. AUGUST 3,003,180
BUTTER APPLICATOR
Filed Nov. 17, 1958

INVENTOR
GEORGE S. AUGUST

BY Karl W. Flocks
ATTORNEY

United States Patent Office 3,003,180
Patented Oct. 10, 1961

3,003,180
BUTTER APPLICATOR
George S. August, 9225 Colesville Road,
Silver Spring, Md.
Filed Nov. 17, 1958, Ser. No. 774,291
12 Claims. (Cl. 15—514)

The present invention relates to a butter applicator for applying butter to corn-on-the-cob, and more particularly to such an applicator that may be mounted on the blade of a knife.

The buttering of corn-on-the-cob is usually accomplished by taking up a small piece of butter on the end of a table knife and then maneuvering the knife and corn so that the butter melts and is applied to substantially all parts of the corn. This is recognized as a rather cumbersome procedure, and many efforts have been made to provide a butter applicator that is more facile to use than the table knife.

Many prior art butter applicators have been provided with a laterally extending handle, and this has resulted in a relatively expensive implement. Other applicators have been provided with short knobs or handles, and these have had the defect that the user often got the butter on his fingers, so that these implements were rejected as not being sufficiently fastidious for table use. A further deficiency in the known butter applicators, and one that was common to the large majority of them, was that it was practically impossible to control the butter after it had melted and after a sufficient amount of it had been applied to the corn. As a result, with these applicators either the butter ran into the main dining plate, or a separate plate was provided to receive the applicator after its use. Thus, either the main dining plate had an undesirable pool of butter therein, or it was necessary to provide the separate plate to receive the applicator after use. Still another defect that was common to many of the prior art butter applicators was that they were difficult to clean after use, thus presenting a hygienic problem.

An object of the present invention is to provide a butter applicator that may be mounted on the blade of a knife.

Another object of the present invention is the provision of a butter applicator that may be mounted on knives having various shaped blades.

A further object of the present invention is to provide a butter applicator that is economical, durable and easily fabricated.

A still further object of the present invention is the provision of a butter applicator that holds butter in a chamber therein so that discharge of butter may be easily controlled.

Yet another object of the present invention is to provide a butter applicator that may be readily cleaned.

Another object of the present invention is the provision of a butter applicator that will permit buttering of corn-on-the-cob with a minimum of effort, and with great tidiness.

Other objects and the nature and advantages of the instant invention will be apparent from the following description taken in conjunction with the accompanying drawings, wherein.

Figure 1:
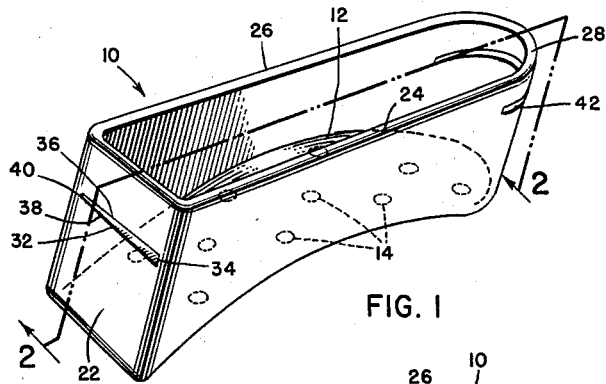
FIG. 1 is a perspective view of a butter applicator in accordance with the present invention.

Referring now to the drawings, wherein like reference numerals are used to designate like or corresponding parts throughout the several views, there is shown in FIG. 1 a butter applicator 10 having a bottom 12 with perforations 14 therein. The applicator 10 is made of a relatively soft and resilient material, such as polyethylene, and has integral upstanding and peripherally extending walls extending upwardly from the bottom 12.

Figure 2:
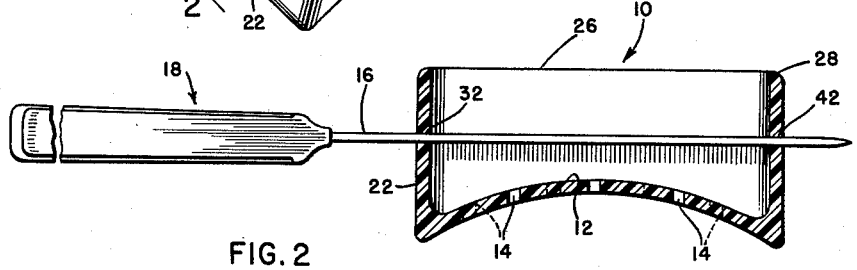
FIG. 2 is a sectional view taken on the line 2—2 of FIG. 1 and showing a knife with the butter applicator mounted thereon.

As may be seen from FIG. 2, the bottom 12 is arched in the longitudinal direction, and the entire applicator 10 is supported on the blade 16 of a knife 18 by parts that will be discussed hereinbelow.

Figures 3, 6, 7:
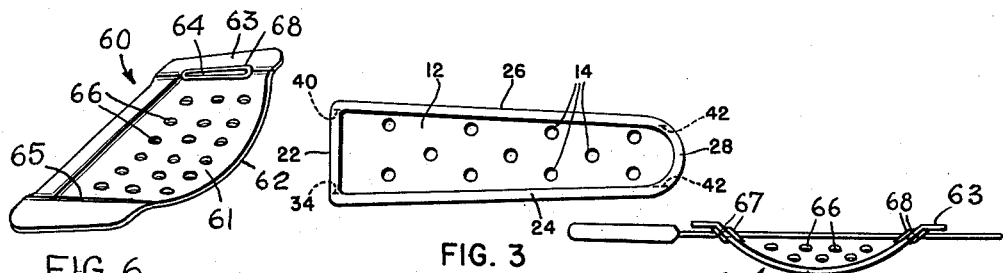
FIG. 3 is a plan view of the butter applicator shown in FIG. 1, without a knife therein.
FIG. 6 is a perspective view of a further embodiment of the invention.
FIG. 7 is a side view of the embodiment of FIG. 6.

In FIG. 3, the applicator 10 may be seen to have a relatively short, generally flat end wall 22 that has a relatively long back wall 24 joined thereto and extending at approximately a right angle from it. Opposite the back wall 24 is a relatively long front wall 26, the front wall 26 also being joined to the rear wall 22. A short curved end wall 28 joins the back wall 24 and front wall 26, so that it may be seen that all of the walls are joined to provide a continuous and unbroken wall extending upwardly from the bottom 12. The front wall 26 has the part thereof adjacent end wall 22 substantially perpendicular to the end wall 22. The part of front wall 26 that is adjacent the curved end wall 28 curves or converges towards the back wall 24. It may accordingly be seen that the space defined within and by the walls 22, 24, 26 and 28 is generally in the shape of the blade of an ordinary table knife.

Referring again to FIG. 1, it may be seen that the end wall 22 has a slot 32 therein intermediate the height thereof. Slot 32 is triangular and has a short back margin 34 that is generally parallel to the back wall 24. The margin 34 of slot 32 is also substantially in alignment with the inner edge of back wall 24, as may be seen in FIG. 3.

Slot 32 also has relatively long top and bottom margins 36 and 38, respectively that converge towards the front wall 26, and meet at a point 40 that is substantially in alignment with the inner face of front wall 26, as may be seen in FIG. 3.

A similar triangular slot 42 may be seen in the end wall 28.

The size of the slots 32 and 42 is such that the margins thereof will embracingly engage the surfaces of a table knife when the knife is inserted into and through the applicator 10. Since the material of which the applicator 10 is made is resilient, the slots 32 and 42 may be made somewhat undersize so that they will yield when the knife blade 16 is inserted.

Figure 4:
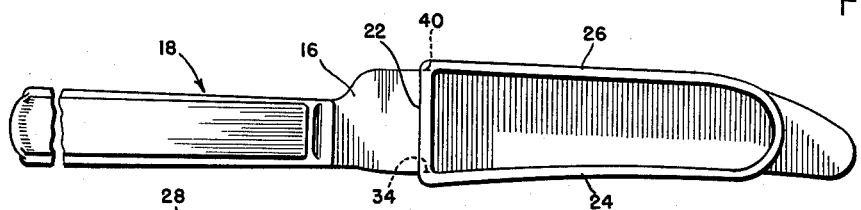
FIG. 4 is a view similar to FIG. 3, but showing a knife inserted into the butter applicator.

In FIG. 4, there may be seen a knife 18 inserted into a holder 10. The inner face of back wall 24 engages the back of the blade 16 of the knife 18, and the cutting edge of the blade 16 is in tight engagement with the inner face of front wall 26; as may be seen in FIG. 4, the front wall 26 has been somewhat distended by the blade 16, it having yielded to accommodate the blade 16. The tip of the blade 16 of the knife extends through the slot 42, and it may thus be seen that the applicator is firmly and securely on the blade 16.

To use the above described applicator, a quantity of butter is placed in it below the level of slots 32 and 42. The applicator 10 is then mounted on the blade 16 of a knife, to thus give the configurations and arrangement of parts shown in FIGS. 2 and 4. The butter is contained in a chamber formed by the knife blade 16, the bottom 12 and the walls 22, 24, 26 and 28. This chamber is sealed, except for the perforations 14 in the bottom 12. The applicator 10 is then brought near a cob of corn, and the arched bottom 12 is placed on the hot corn so that the heat thereof melts the butter in the applicator 10. The melted butter then runs out of the applicator 10 through the perforations 14 and thus flows onto the corn. When a sufficient amount of butter has been applied to the corn, it is only necessary to invert the knife 18 with the applicator 10 thereon, and the butter will no longer be in contact with the bottom 12, and hence is not able to run out of the perforations 14. Because the blade 16 has complete sealing contact and engagement with the margins of the slots 32 and 42, and with the inner faces of the back wall 24 and front wall 26, the butter cannot escape from the chamber thus formed. Hence, the handling of the applicator of the present invention will be seen to be extremely facile and the corn may be buttered neatly and without mess.

Figure 5:
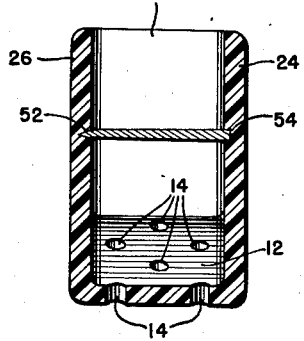
FIG. 5 is a transverse cross-sectional view of another embodiment of the butter applicator in accordance with the present invention.

In FIG. 5, there may be seen another embodiment of the applicator of the present invention, FIG. 5 being a transverse cross-sectional view. The inner face of front wall 26 has a small V-shaped groove 52 therein and opposite the V-shaped groove 52 is a square-cut groove 54 in the inner face of the back wall 24. There may be also seen in FIG. 5 the forward wall 28 which has a slot 42 therein not shown. The margins defining the slot 42 coincide with the edges and margins of the grooves 52 and 54.

The embodiment of FIG. 5 is used in substantially the same manner as that of FIGS. 1 to 4, the grooves 52 and 54 insuring a more positive sealing engagement of the applicator 10 with the knife blade 16.

It will be noticed that there are no sharp interior corners or recesses, and hence the cleaning of the applicator after use may be accomplished quickly and readily, as by running warm water over and through the applicator.

The embodiment of FIGS. 6 and 7 comprises a butter applicator 60 that may be stamped from sheet metal and has a depressed concave oblong central part 61 forming a chamber having an open side. Part 61 has a free, arcuate edge 62 that is preferably sharpened. A flange 63 extends on three sides of the central part 61, at the upper margin thereof. Slightly below the level of the flange 63, at opposite ends of the part 61, are a pair of aligned knife blade receiving slots 64 and 65. A knife blade inserted through slots 64 and 65 will have the back thereof in engagement with the back of part 61, at or below the flange 63. The part 61 is provided with spaced holes 66 to permit the flowing of melted butter from the chamber formed by part 61. Preferably the slots 64 and 65 have therein soft grommets 67 and 68 which are engaged by the knife blade. This, as is shown in FIG. 7, helps to insure the sealing engagement of the knife blade and the applicator, and also prevents scratching of the knife blade.

In use, the applicator shown in FIGS. 6 and 7 may be mounted on a knife blade, and then the sharpened edge 62 may be used to cut a lump of butter from a block or stick of butter, this lump occupying a position between the knife blade and part 61. The applicator 60 may then be used in the usual manner.

There has been provided an applicator that may be mounted on the blade of a knife, and may be used on the blades of practically all knives in common use. The applicator of the present invention is economical to fabricate, and may be seen to be both durable and easily fabricated. This applicator is extremely easy to use and permits the buttering of corn-on-the-cob with great tidiness.

It will be obvious to those skilled in the art that various changes may be made without departing from the spirit of the invention and therefore the invention is not limited to what is shown in the drawings and described in the specification but only as indicated in the appended claims.

What is claimed is:

1. A butter applicator comprising a body of resilient material having a perforated bottom and integral upstanding peripherally extending walls, said walls comprising a generally flat short end wall, a relatively long back wall joined to and extending at approximately a right angle from said end wall, a relatively long front wall opposite said back wall and joined to said end wall, and a short curved end wall joining said front and back walls, aligned slots in said two end walls intermediate the height thereof, said slots being triangular and having short back margins adjacent said back wall and long top and bottom margins converging toward said front wall, whereby a knife blade may be inserted through said slots to support said applicator and to form a chamber above said bottom.

2. A butter applicator comprising a body of resilient material having a perforated bottom and integral upstanding peripherally extending walls, said walls comprising a generally flat short end wall, a relatively long back wall joined to and extending at approximately a right angle from said end wall, a relatively long front wall opposite said back wall joined to said end wall, and a short curved end wall joining said front and back walls, and aligned slots in said two end walls intermediate the height thereof, whereby a knife blade may be inserted through said slots to support said applicator and to form a chamber above said bottom.

3. A butter applicator comprising a body having a perforated bottom and integral upstanding peripherally extending wall means, and aligned, opposed slots in said wall means intermediate the height thereof, said slots being triangular and having short back margins and converging long top and bottom margins.

4. The applicator of claim 3, the material of said body defining said slots being resilient.

5. A butter applicator comprising substantially continuous wall means defining a chamber open at one end for receiving butter, means for receiving a knife blade in closing and sealing relationship with said wall means to close the open end thereof, and perforations extending through said applicator into said chamber.

6. A butter applicator comprising means defining a chamber for holding butter, perforations through said chamber defining means to permit the flow of butter from said chamber, and slot means in said chamber defining means for receiving a blade in closing and sealing relationship therewith, whereby butter may be placed in the chamber and a handled blade inserted through said slot means.

7. A butter applicator comprising means defining a chamber for receiving butter, perforations extending through said chamber defining means for permitting melted butter to pass outwardly from said chamber, said applicator further comprising a handled blade, said chamber defining means comprising means for engagingly receiving the blade, whereby said handled blade is the handle for said applicator.

8. A butter applicator comprising a depressed concave central part defining a chamber, perforations extending through said applicator and communicating with said chamber for permitting melted butter to pass outwardly from said chamber, and a pair of knife-blade receiving slots in opposed relationship in said applicator.

9. The applicator of claim 8, and soft, yielding grommets in said slots.

10. The applicator of claim 9, said chamber being open at one side thereof.

11. The applicator of claim 10, said part at the open side of said chamber having a cutting edge.

12. The applicator of claim 8, said central part being generally oblong in shape, said slots being at opposite ends thereof and the back of said chamber being disposed for contact with the back of a knife blade.

References Cited in the file of this patent

UNITED STATES PATENTS

| | | |
|---|---|---|
| 20,929 | Banta | July 20, 1859 |
| 49,200 | Tileston | Aug. 1, 1865 |
| 2,146,236 | Stamp | Feb. 7, 1939 |
| 2,527,149 | Peterson | Oct. 24, 1950 |
| 2,739,328 | Bernier | Mar. 27, 1956 |
| 2,814,868 | Wellinger | Dec. 3, 1957 |